(12) United States Patent
Frier et al.

(10) Patent No.: US 10,059,254 B2
(45) Date of Patent: Aug. 28, 2018

(54) COMMUNICATING INFORMATION REGARDING STATUS OF VEHICLE OPERATION

(71) Applicants: Ethan Perry Frier, Owings Mills, MD (US); Jonathan Tetsuhiro Ota, Pittsburgh, PA (US)

(72) Inventors: Ethan Perry Frier, Owings Mills, MD (US); Jonathan Tetsuhiro Ota, Pittsburgh, PA (US)

(*) Notice: Subject to any disclaimer, the term of this patent is extended or adjusted under 35 U.S.C. 154(b) by 488 days.

(21) Appl. No.: 14/367,320

(22) PCT Filed: Dec. 20, 2012

(86) PCT No.: PCT/US2012/070873
§ 371 (c)(1),
(2) Date: Jun. 20, 2014

(87) PCT Pub. No.: WO2013/096583
PCT Pub. Date: Jun. 27, 2013

(65) Prior Publication Data
US 2014/0354419 A1    Dec. 4, 2014

Related U.S. Application Data

(60) Provisional application No. 61/578,099, filed on Dec. 20, 2011.

(51) Int. Cl.
*B60Q 1/26* (2006.01)
*B60R 25/10* (2013.01)

(52) U.S. Cl.
CPC ............... *B60Q 1/26* (2013.01); *B60R 25/10* (2013.01)

(58) Field of Classification Search
CPC .................................. B60Q 1/26; B60R 25/10
See application file for complete search history.

(56) References Cited

U.S. PATENT DOCUMENTS

| | | | | |
|---|---|---|---|---|
| 6,104,975 A | * | 8/2000 | Matsuo | B62M 25/08 474/70 |
| 6,166,496 A | * | 12/2000 | Lys | H05B 33/0857 315/292 |
| 7,507,007 B1 | * | 3/2009 | Jhao | B62J 6/001 318/126 |
| 8,337,060 B1 | * | 12/2012 | Frankovich | B60Q 1/326 315/76 |
| 2003/0169594 A1 | * | 9/2003 | Khan | B60Q 1/326 362/500 |
| 2007/0014120 A1 | * | 1/2007 | Kitamura | B62J 6/001 362/473 |
| 2011/0210867 A1 | * | 9/2011 | Benedikt | G08G 1/01 340/905 |
| 2013/0044502 A1 | * | 2/2013 | Guzik | B62J 6/00 362/473 |

* cited by examiner

*Primary Examiner* — James Yang
(74) *Attorney, Agent, or Firm* — K&L Gates LLP

(57) ABSTRACT

Tools, techniques, strategies, devices, and systems are provided for processing and communicating the status of the operation of a vehicle using the visual effects of lighting devices. A lighting system is provided that uses a wide range of sensors, automated functionality, and communication modules for providing visual indications to others regarding the state of a bicycle and/or its operator.

19 Claims, 18 Drawing Sheets

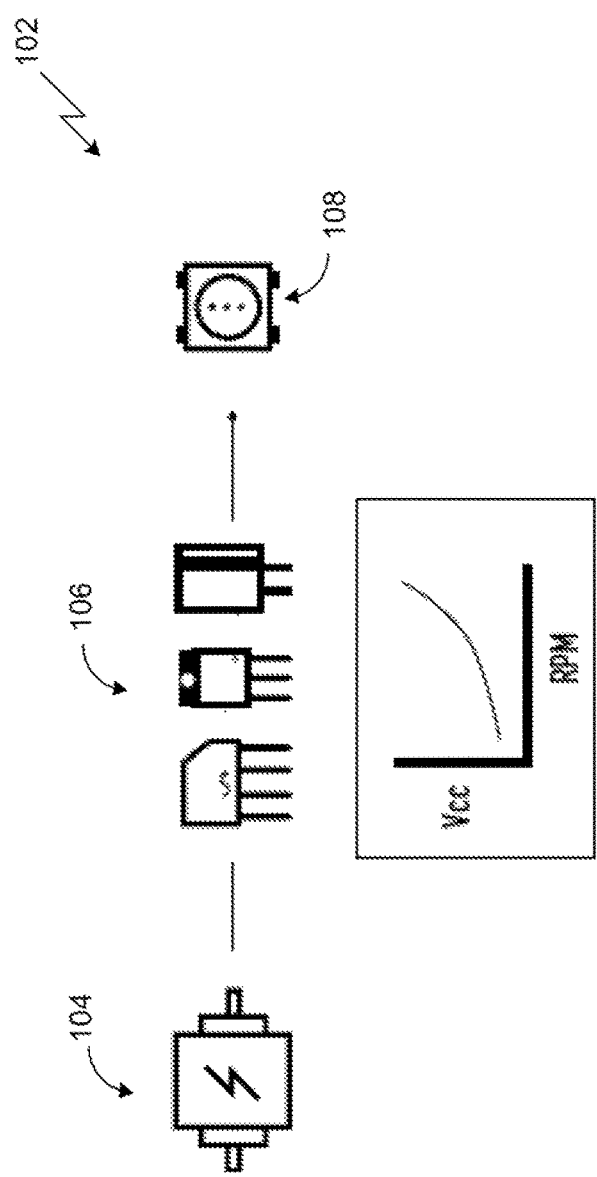

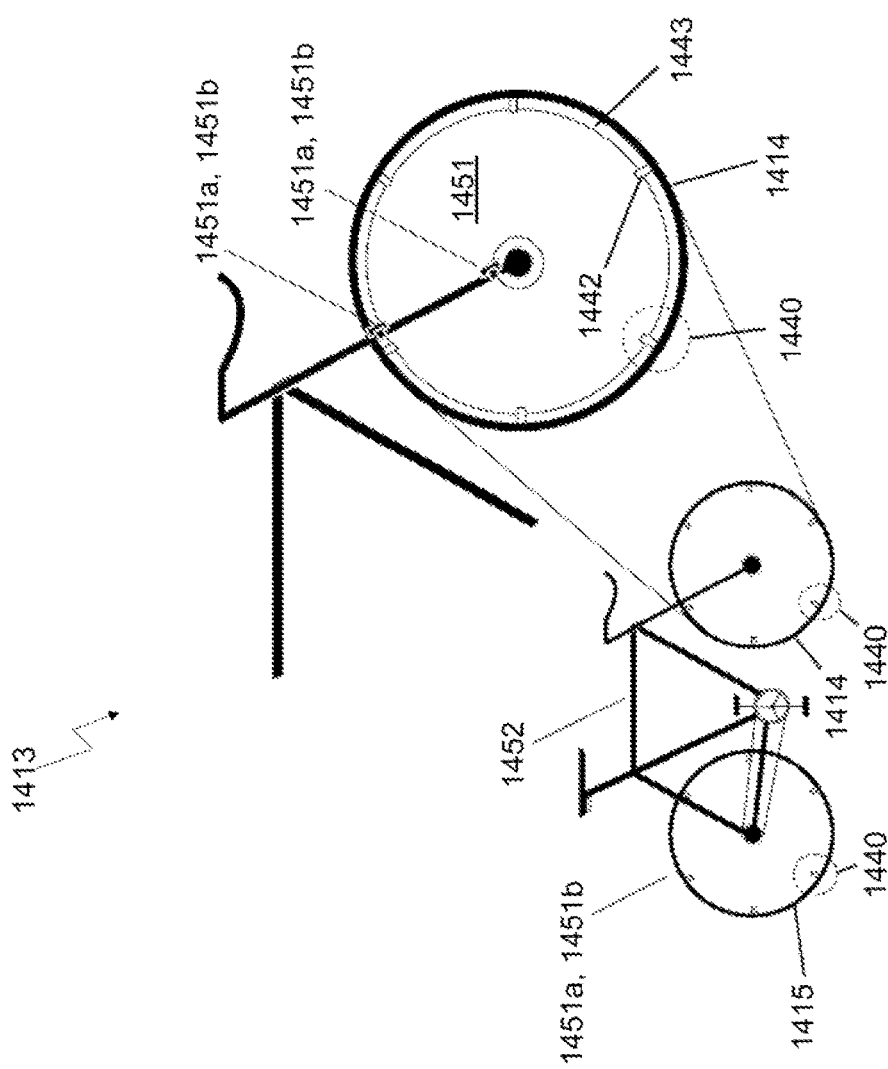

COMMUNICATING INFORMATION REGARDING STATUS OF VEHICLE OPERATION

CROSS-REFERENCE TO RELATED APPLICATIONS/PRIORITY CLAIM

The present application is a National Stage of International Application No. PCT/US12/70873, filed on Dec. 20, 2012, which claims the benefit of U.S. Provisional Patent Application Ser. No. 61/578,099, filed on Dec. 20, 2011, the contents of which are hereby incorporated by reference into the present application.

FIELD OF THE INVENTION

Various embodiments of the invention described herein generally relate to tools, techniques, strategies, devices, and systems for processing and communicating the status of the operation of a vehicle such as a bicycle. In certain specific embodiments, the invention relates to a lighting system for a bicycle and, more particularly, to a safety lighting system for a bicycle providing a range of automated functionality for providing visual indication to others (e.g., nearby motorists) regarding the state of the bicycle.

BACKGROUND

Many conventional illumination systems for vehicles such as bicycles do not effectively or sufficiently communicate information to others (e.g., other motorists on a road) about the condition or state of operation of the vehicle.

Riding at night can be a daunting and dangerous task and is an issue that many bike commuters contend with on a daily basis. Existing bicycle lighting systems suffer from a number of deficiencies. For example, one common bicycle lighting paradigm is to utilize a white headlight on a front of the bicycle and a red taillight on a rear of the bicycle. However, this may not be the most effective means of increasing the visibility of bikers to motorists. In particular, front and rear lights typically do little to identify and distinguish a biker from other ambiguous points of light in the roadway, such as streetlights, signs, and the like. In many cases, the range and intensity of these lights may be insufficient to catch the attention of a motorist, especially one who is not paying enough attention to his environment. Also, existing lighting systems typically do not operate effectively to identify a bicycle as a bicycle (i.e., instead of another type of vehicle such as another car). In any event, existing lighting systems and devices do not provide sufficient information to a motorist as to the state of operation of the vehicle, such as whether the biker is speeding up or slowing down, for example.

Other issues associated with bicycle lighting and visibility fall on the part of the biker. For example, if the biker fails to turn on the lighting system prior to riding the bicycle, then the lighting system obviously does not provide any advantages to the biker or others near the bicycle. In another example, a rider is unlikely to notice that the tail light is not activated, which leaves the rider potentially at risk for an entanglement with another person or other vehicle.

Therefore, enhanced techniques, strategies, and devices are needed that can effectively communicate the status of a vehicle (e.g., a bicycle) and/or its operator to others during use of the vehicle. For example, having recognized the above-mentioned problems, the inventors have observed that there remains a need for a bicycle illumination system that can provide an enhanced level of integrity and utility in providing useful information to other vehicle operators in the vicinity of a bicycle in order to promote safety for the biker and others as well. There is also a need for a lighting system and associated visual effects that can effectively identify a vehicle as having the form and shape of a bicycle (i.e., instead of another type of vehicle such as another car).

BRIEF DESCRIPTION OF THE FIGURES

The utility of the embodiments of the invention will be readily appreciated and understood from consideration of the following description of the embodiments of the invention when viewed in connection with the accompanying drawings. The accompanying drawings, which are included as part of the present specification, illustrate the presently preferred embodiment and, together with the general description given above and the detailed description of the preferred embodiment given below, serve to explain and teach the principles of the present invention.

FIG. 1 includes a schematic illustration of one example of a state sensing and effect control system;

Figure 2A:
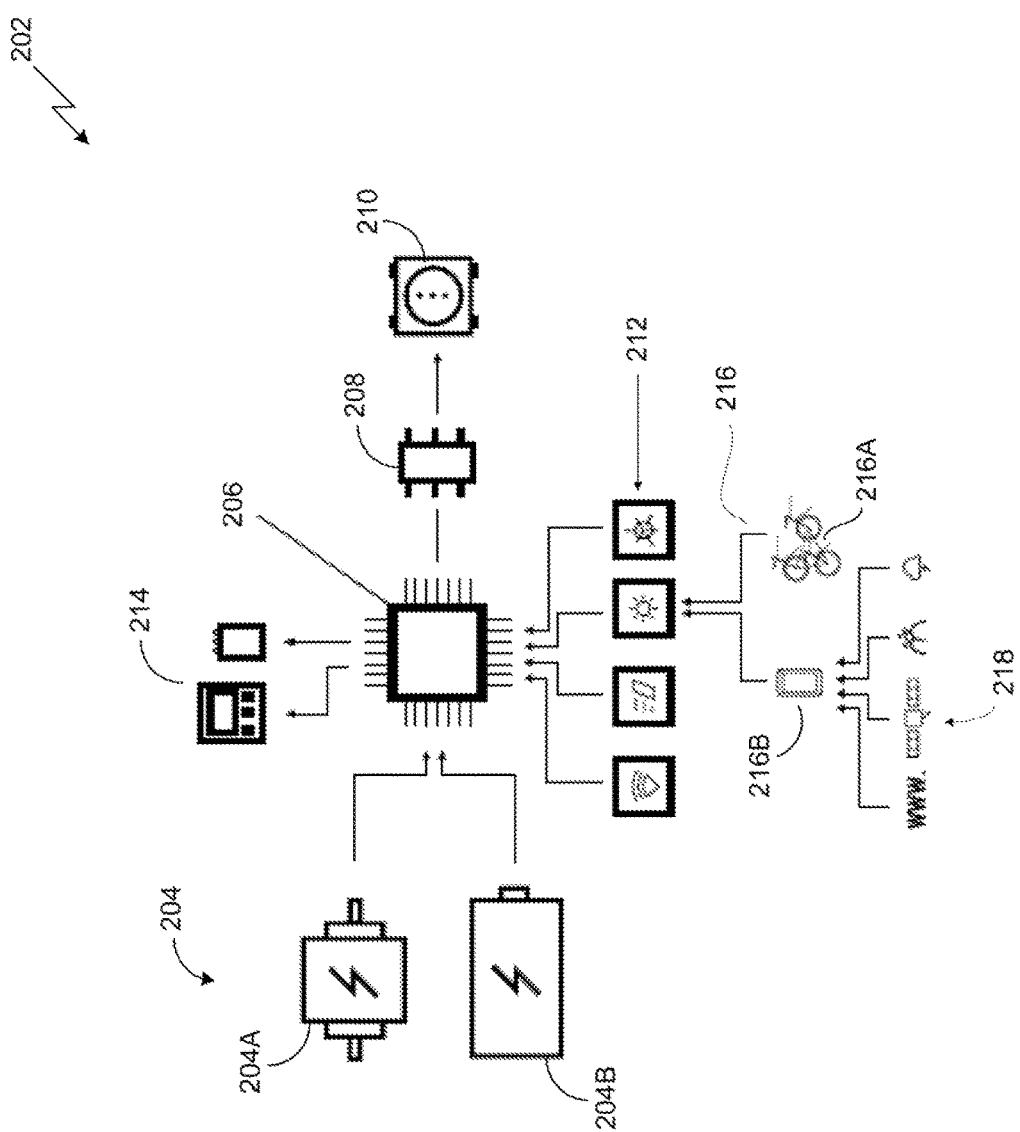
FIG. 2A includes a schematic illustration of an example of a state sensing and effect control system.

It should be noted that the figures are not necessarily drawn to scale and that elements of similar structures or functions are generally represented by like reference numerals for illustrative purposes throughout the figures. It also should be noted that the figures are only intended to facilitate the description of the various embodiments described herein. The figures do not necessarily describe every aspect of the teachings disclosed herein and do not limit the scope of the claims.

DESCRIPTION

In various embodiments described herein, the invention offers tools, techniques, strategies, devices, and systems for processing and communicating the status of the operation of a vehicle such as a bicycle. In certain specific embodiments, a lighting or illumination system for a bicycle can be provided. Also, a safety lighting system for a bicycle can be provided with a range of automated functionality for providing visual indications to others (e.g., nearby motorists or other cyclists) regarding the operational state of the bicycle and/or its rider. In developing the invention, the inventors have recognized that many pre-existing illumination systems for vehicles such as bicycles do not effectively or sufficiently communicate information to others (e.g., other motorists on a road) about the condition or state of operation of a vehicle.

Primarily for convenience of disclosure and by way of example and illustration, embodiments of the invention have been described herein in the context of operating a vehicle which is a manually operated, non-motorized bicycle. However, those skilled in the art will appreciate that other types of vehicles (e.g., motorcycles, scooters, cars, mopeds, etc.) may be included within the scope of applying certain embodiments of the invention.

In accordance with various embodiments, the invention provides a safety lighting system structured for use with a bicycle. The safety lighting system may comprise a power source couplable to a bicycle having a frame and front and rear wheel; an illumination system which can be coupled to a rim of the front and rear wheels; and a power transfer system couplable to the illumination system to transfer power from the power source to the illumination system, wherein the lighting system is configured to visually indicate a form factor and state of operation of a bicycle to which it is coupled. The lighting system may be configured to convert rotation movement of one of the front and rear wheels of a bicycle to which it is coupled into electrical power to power the illumination system. The power source may be a hub dynamo forming the hub of one of a front and rear wheels of a bicycle, or the power source may be a battery.

In various embodiments, the safety lighting system may further comprise a controller unit coupled to the power source and to first and second slip rings, wherein the controller unit is configured to convert an alternating current (AC) produced by the power source to a direct current (DC). The controller unit may include a wave bridge rectifier, and a capacitor and a voltage regulator wired in parallel with the capacitor to the rectifier and a microcontroller, for example. In certain embodiments, the controller unit may be coupled to the hub dynamo and the power transfer system, wherein the controller unit is configured to convert an alternating current (AC) produced by the power source to a direct current (DC).

In certain embodiments, the power transfer system may comprise first and second slip rings couplable to front and rear wheels of a bicycle. The slip ring may include a plurality of copper rings and a plurality of runners in contact with the plurality of copper rings and coupled to the controller unit.

In various embodiments, the illumination system may include a plurality of LEDs mountable on or in the rims of the front and rear wheels. The illumination system may include a plurality of light diffusers, wherein one of the plurality of light diffusers can be optically coupled to one of the plurality of LEDs. The plurality of LEDs may be configured to change color as a function of rotational speed of at least one of the front or rear wheels of a bicycle to which the lighting system is coupled. In certain embodiments, the illumination system may include a plurality of LEDs mountable on or in the rims of the front and/or rear wheels of a bicycle and couplable to corresponding first and second slip rings.

In various embodiments, the power transfer system of the safety lighting system can be structured to be wirelessly couplable to the illumination system. A controller unit can be provided which is couplable to the power source, a transmitter can be provided which is couplable to the controller unit, and a wireless receiver can be provided which is couplable to the transmitter and to the illumination system. In certain embodiments, the transmitter and receiver can be structured as magnetic induction or radio frequency transmitters and receivers.

It can be appreciated that examples of bicycle safety lighting systems and methods have been described herein that facilitate visual indication of a bicycle's presence and state of operation to nearby motorists, pedestrians and/or other bicyclists. The bicycle safety lighting system can provide a range of automated functionality for providing visual indication regarding the state of the bicycle. The bicycle safety lighting system can also provide illuminated bicycle rims that create an immediate formal context for drivers to identify bicyclists and the state of their bicycle.

Various embodiments provided herein may be directed to a lighting system for a bicycle and, more particularly, to a safety lighting system for a bicycle providing a range of automated functionality for providing visual indication to nearby motorists regarding the state of the bicycle. The present system may include illuminated bicycle rims that create an immediate formal context for drivers to identify bicyclists and the state of their bicycle. The bicycle lighting system may be more convenient for bicyclists, address mistakes that are made by both bicyclists and automobile drivers in regard to safety, and better inform automobile drivers about a bicyclist's presence and actions as compared to commonly used conventional bicycle lighting systems, such as prior front-and-rear light combinations.

In many accident scenarios, a root cause of the accident is a lack of information on the part of one or both of the parties involved. Also, bicyclists often cannot be readily seen at night or during inclement weather, for example. Embodiments of the invention can be used to bring a bicyclist to the attention of others, such as automobile drivers, by illuminating the natural form factor of the bicycle and without being overly intrusive to the biking experience.

In various embodiments, the safety lighting system may comprise certain major components: a power source, a power transfer system, and an illumination means. In certain embodiments, the present system converts rotational movement of a front wheel of a bicycle into usable power by a dynamo integrated into the hub of the front wheel of the bicycle. The power generated by the bicyclist's pedaling can be transferred to a power control unit via an output wire attached to a fork of the bicycle. The power control unit can be mounted in an unobtrusive location on the bicycle to manage the power output by the dynamo. The power control unit converts the power to be compatible with the illumination system. The power output may be split into two channels, one for the front wheel and one for the rear wheel. In an alternate embodiment, the present system utilizes a battery in place of or in conjunction with a dynamo.

The power transfer system of the present system enables the transfer of power to the rotating wheels of the bicycle during use. The power transfer system can provide both electricity and data. In one embodiment, the transfer of power is accomplished via a slip ring mounted to a hub of each wheel. In another alternate embodiment, the present system utilizes a wireless power transfer mechanism to increase operational longevity of the present system by avoiding the high wear inherent in slip rings. Power can be transmitted to a receiver on each wheel of the bicycle by a transmitter located in an unobtrusive location on the bike, and the receivers can in turn power the corresponding illumination means.

The illumination means of the present system provides may be a colored illumination means comprising a plurality of tri-diode RGB LEDs arranged at regular intervals around a circumference of each wheel, for example. The light emitted by the LEDs passes through a translucent diffuser which increases the viewable light emitted by the LEDs. The LEDs can be embedded inside the rim, project through holes drilled in the rim, or attach to an outside surface of the rim.

The present system is configured to vary the color of light emitted from the illumination means in relation to the speed of the bicycle. At slow speeds, the LEDs may emit a cautionary red color. As the bicycle increases speed, the emitted light may fade to white, for example. With the use of a sensor mounted to the brake lever, the LEDs can also act as a manual brake light that turns red when the brake lever is depressed. The LEDs also have the ability to change or alternate between different colors other than red and white according to data supplied by the power control system.

The present system provides various means of actuating the bicycle lighting system, including automatic actuation once the rider starts to pedal, manual actuation, or electronic actuation based on input from one or more sensors located on the bicycle. The LED colors can also change based on input from sensors on the bicycle or by the pedal action of the rider.

The present embodiments provided herein are directed to bicycle safety lighting systems and methods that facilitate visual indication of bicycle's presence and state of operation to nearby motorists, pedestrians, and/or other bicyclists. The present system can be designed to provide automatic actuation of an illumination means on a bicycle in order to provide visual indication to nearby motorists, pedestrians, and other bikers as to the presence and operation of the bicycle, thereby enhancing the safety of both a biker as well as others nearby.

It can be appreciated that aspects of the present invention may be incorporated as original components of a vehicle or bicycle, such as by an original equipment manufacturer or at the time of initial factory production of the vehicle, for example. In addition, in certain embodiments, aspects of the invention may be installed on an existing vehicle or bicycle, as part of a retrofit process or other retrofit kit that provides components of a lighting system, for example.

FIG. 1 schematically illustrates an example of a state sensing and effect control system 102 that can be employed in connection with various embodiments of the invention. In the example shown, the system 102 includes an analog (i.e., not digital) version of a state sensing and effect control system. The system 102 includes a power source 104 which may be a dynamo or other generator which can be coupled to a bicycle or other vehicle to generate or derive electrical power from manual movement of the wheels of the bicycle by the cyclist, for example. The power source 104 may be operatively associated with one or more power management components 106 (e.g., diodes or transistors) which condition power generated by the dynamo to provide a suitable input voltage (e.g., Vcc). The voltage level may be generated in response to a velocity (e.g., RPM), acceleration, or another mechanical characteristic of the wheel of the bicycle, for example. The voltage level can be input to one or more lighting devices 108 such as light-emitting diodes (LEDs), for example, whose characteristics or visual effects (e.g., color) may change as a function of the voltage across the input of the lighting device 108. In various embodiments, the lighting devices 108 may be embedded into or attached to (e.g., by clips) to the rims of the wheels of a vehicle, for example. In various embodiments, color change may be defined by variable voltage output of a hub dynamo or linear induction, for example. For certain devices 108, lower speed may result in lower voltage and higher speed may result in higher voltage. For example, for certain LEDs, at lower voltages only the red diode of each RGB LED illuminates; as the velocity of the bicycle increases and generates a higher voltage, the green and blue diodes can illuminate to create a white light illumination effect.

FIG. 2A schematically illustrates an example of a state sensing and effect control system 202 that can be employed in connection with various embodiments of the invention. In the example shown, the system 202 includes a digital version of a state sensing and effect control system. The system 202 may provide a way to sense multiple physical states of a bicycle or its cyclist as defined by input from devices or communication media such as Hall effect switches, reed switches, magnets, accelerometers, light sensors, and/or radio frequency transceivers which encompass wireless technology such as Wifi and Bluetooth, for example.

The system 202 includes a power source 204 which may be a dynamo 204A or other generator which can be coupled to a bicycle or other vehicle to generate or derive electrical power from manual movement of the wheels of the bicycle by the cyclist, for example. The power source 204 may alternatively include a battery 204B, for example, instead of or configured to work in conjunction with the dynamo 204A. The power source 204 may be electrically coupled to at least one controller 206 (e.g., a microcontroller) that directs certain functions performed by the system 202. The controller 206 may be programmed to direct the function of one or more drivers 208, for example, that are operatively associated with one or more lighting devices 210, such as LEDs, for example. The driver 208 may be part of a data communication module programmed to communicate instructions from the controller 206 to the lighting devices 210. Such data communication modules may include a number of components, devices, software, hardware, or computer-readable instructions for directing the actions of the lighting devices 210. In various embodiments, the lighting devices 210 may be embedded into or attached to (e.g., by clips) to the rims of the wheels of a vehicle, for example. Through the driver 208, the controller 206 may direct one or more of the lighting devices 210 to display one or more of a variety of colors or flashing light effects, for example, among other visual effects. Examples of possible visual effects include, without limitation, color change, intensity or brightness change, pattern change, flashing or non-flashing, fade, multiple colors or lights displayed at the same time or in a sequence, and/or many other kinds of lighting effects or other visual effects.

In certain embodiments, one or more sensors 212 can be operatively associated with the controller 206 to receive and process a physical or mechanical state of a vehicle, a condition of a cyclist, and/or data communicated from various external sources (e.g., the Internet). Examples of sensors 212 include Hall effect switches or reed switches that can be used to sense rotation of a bicycle wheel, accelerometers, tilt sensors, and/or many other types of suitable sensors 212 or sensing devices. These sensors 212 can be used in connection with modifying a light display or other visual effect at the lighting device 210, for example, or in association with other peripherals 214 connected to the vehicle. For example, the sensors 212 may detect speed, rotations per minute, or rim location relative to the bicycle frame. In another example, the sensors 212 may include one or more accelerometers that can be used to sense a change in orientation of the bicycle and affect the lighting devices 210 or connected peripherals 214 accordingly. In certain embodiments, the sensors 212 may include one or more light sensors that can be used to automatically turn on or turn off connected lights in response to different environmental conditions (e.g., morning or evening lighting at a given time of day, atmospheric or weather conditions, and/or detected road conditions such as snow or rain, among others). An example of a peripheral 214 is a screen display or other control can be accessed to manage different functions of the system 202. It can be seen that the sensors 212 may be programmed or configured to interact with one or more connected objects 216, such as a vehicle or bicycle 216A, or one or more access devices 216B (e.g., mobile phone, smart phone, electronic tablet, global positioning system (GPS), physiological monitoring devices, or many other types of electronic devices).

A wide range of intended lighting effects may be realized through the state sensing and effect control system 202 modifying the visual effect of a lighting device 210. By way of example, and without limitation, such visual effects may include: color yellow to indicate turning (e.g., using Hall effect switch or reed switch); changing from yellow to green to indicate navigation to a desired destination (e.g., using RF transceiver and/or smart phone through a wireless network); white fade on/off to identify bicycle (e.g., using RF transceiver and/or smart phone through a wireless network); white to indicate acceleration and/or cruising speed (e.g., using Hall effect switch or reed switch); red to indicate deceleration or braking (e.g., using Hall effect switch or reed switch); red to indicate a slower than normal vehicle speed or a vehicle speed that falls below a predefined threshold; flashing red to indicate a hazard or accident (e.g., using an accelerometer, RF transceiver and/or smart phone).

In certain embodiments, one or more input data communication modules 218 may be provided to communicate data to or from Internet connected devices (e.g., mobile phones or smart phones), and/or to share state information about the bicycle or rider's physical state to one or more other bicycles within the vicinity of the first bicycle through a wireless network, for example, or other suitable communication media. Information communicated through the data input communication modules 218 may include, without limitation, one or more of the following types of data: bike locater data; friend locater (e.g., locate other bikes with a common color); GPS navigation; GPS location; distance calculation; weather defined color change; accident detection; manual color control; and/or social network connectivity, among others. In certain embodiments, a data input communication module 218 may be programmed to connect with one or more databases of information, such as databases that contain current or historical traffic accident data, for example. In conjunction with connecting to and receiving data from a database, the system 202 can be programmed to generate a visual effect based on the data retrieved from the database. For example, the system 202 may interact with a GPS device to issue a flashing red color effect when the vehicle approaches or is in the vicinity of an intersection which has been flagged in the database as having a higher-than-normal rate of vehicle accidents.

In various embodiments, a visual effect initiated or generated through the system 202 can indicate a change in direction, a change in condition of the vehicle, and/or a change in the condition of the vehicle operator. For example, in connection with a smart phone access device 216B, a rider may be able to send a command to the data communication module 218 to instruct the controller 206 to pulse one or more of the lighting devices 210 so a desired bicycle can be located among many other bicycles (e.g., in a bike rack or at a bike race). Likewise, a team of cyclists may identify with the same color and locate each other at a race by choosing a common color or other common visual effect for the lighting devices 210 to display. In another example, in the navigation context, the lighting device 210 can be instructed to change from yellow to green when the bicycle is within a predetermined distance from a desired destination. An alert such as a weather report may be communicated automatically to the communication module 218, for example, to change a color of a lighting device 210 from blue to purple to indicate that rain or other inclement weather is in the forecast. In another example, time of day data can be communicated to the communication module 218, for example, to indicate that night is approaching and to accordingly brighten the effect of one or more of the lighting devices 210. In another example, a physiological monitor may be a peripheral 214 operatively associated with the controller 206 that detects a heart rate or other health condition of a vehicle operator. If the heart rate of the operator exceeds or falls below a certain threshold value, then one or more of the lighting devices 210 could be made to flash a red warning signal. Likewise, an accelerometer could be employed as a sensor 212 to detect a change in acceleration exceeding a certain predetermined threshold value. If the detected acceleration or deceleration rate exceeds a certain threshold value, for example, then one or more of the lighting devices 210 could be made to flash a warning signal indicating a possible collision. In another example, a sensor 212 may be programmed to detect when a vehicle has stopped or is otherwise inactive and generate a visual effect (e.g., a repeatedly flashing light) that indicates the stopped or inactive state of the vehicle.

Figure 2B:
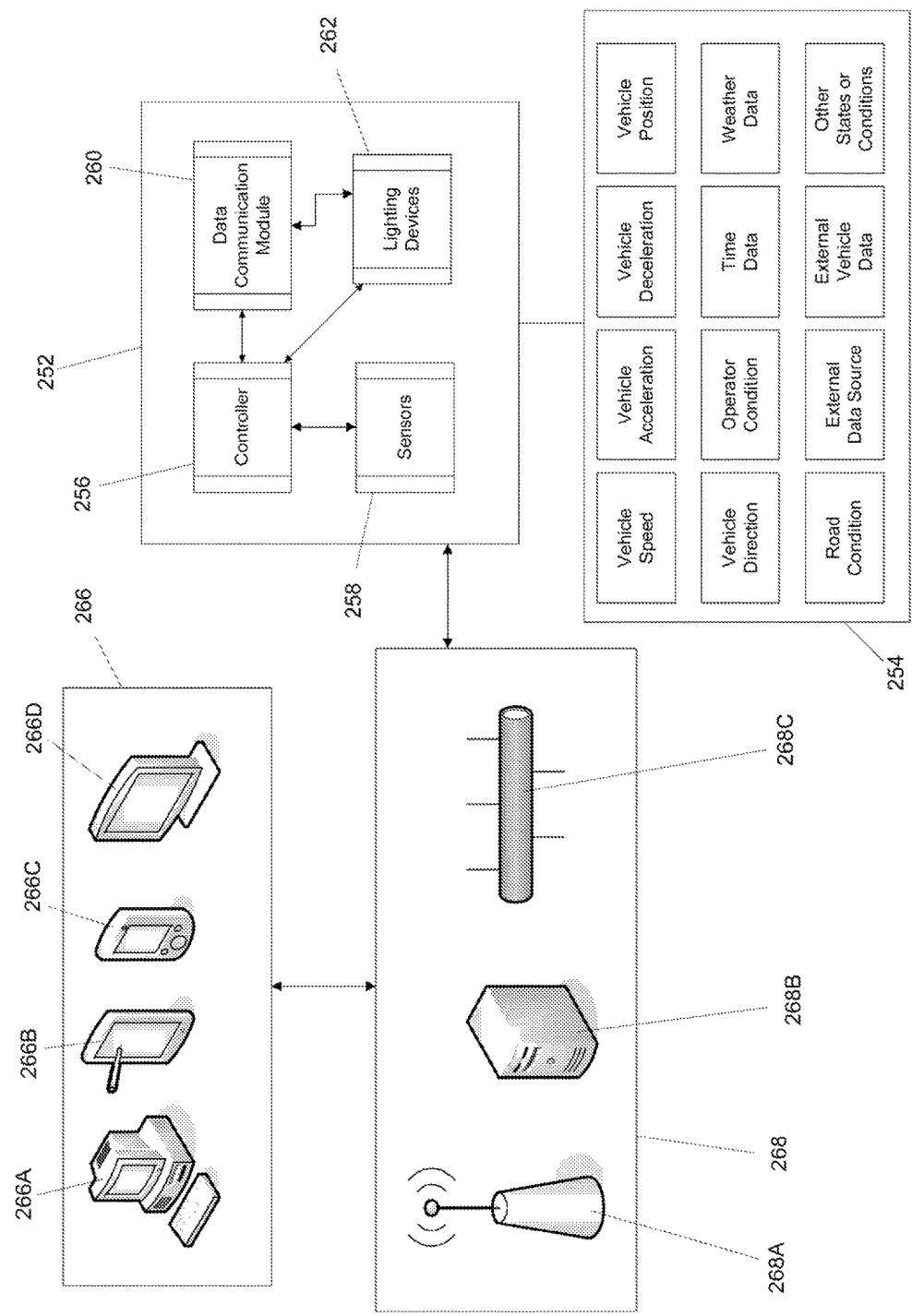
FIG. 2B includes a schematic illustration of a system architecture including an example of a state sensing and effect control system.

FIG. 2B illustrates an example of a state and effect sensing system 252 programmed to receive and process data associated with one or more conditions or states 254 identified in connection with a vehicle or a vehicle operator. The system 252 includes a controller 256 receiving data from one or more sensors 258 which may be configured or structured, in certain embodiments, to communicate signals or data regarding the various conditions or states 254. The controller 256 may be configured to direct the function of a data communication module 260 and/or one or more types of lighting devices 262. For example, the data communication module 260 may communicate a signal to a lighting device 262 to generate a specific visual effect in response to one or more detected states or conditions 254. As shown, one or more different types of access devices 266 (e.g., computer systems 266A, electronic tablets 266B, mobile phones 266C, and/or screen displays 266D) may communicate with the system 252 through one or more types of communication media 268 (e.g., wireless access point 268A, server connection 268B, or hardwire connection 268C).

Figure 3:
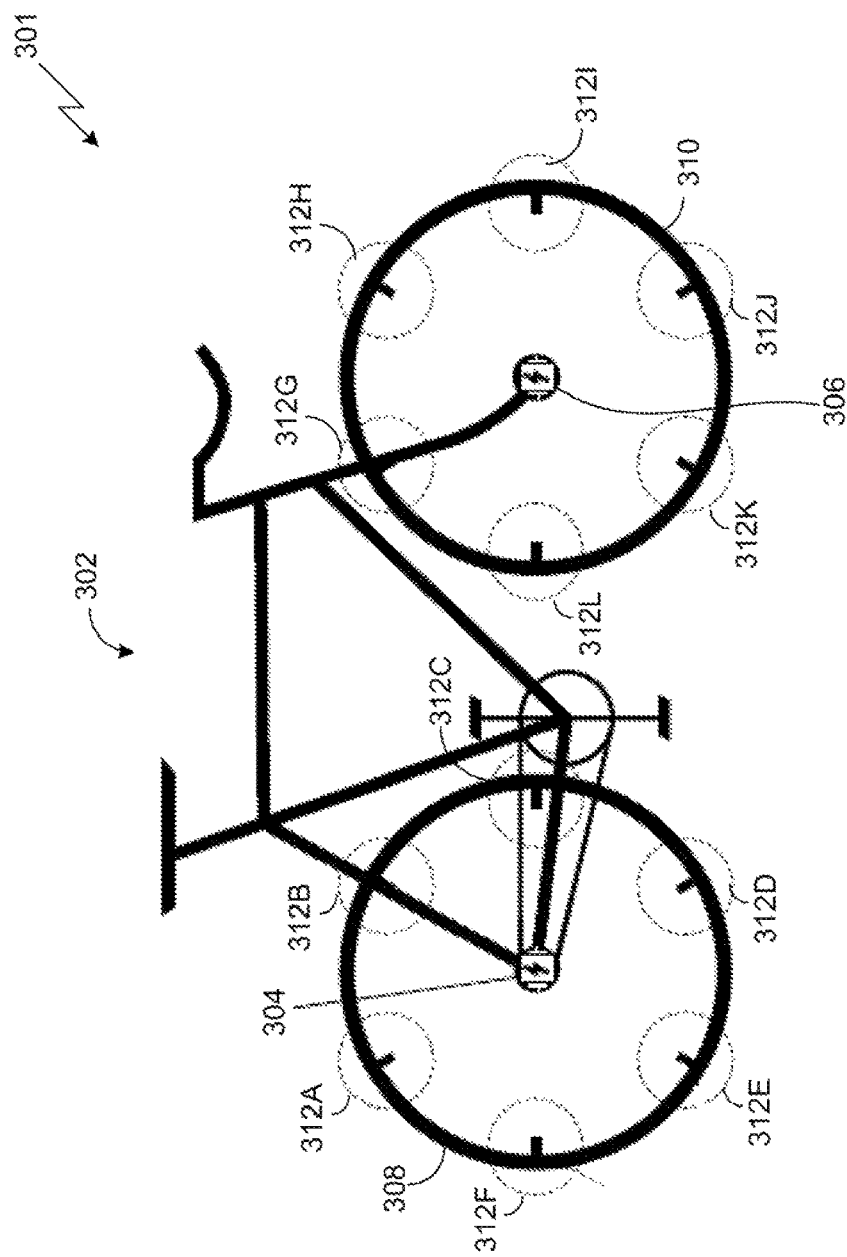
FIG. 3 includes an example of a localized dynamo embodiment of a lighting system structured in accordance with certain embodiments of the invention.

FIG. 3 schematically illustrates an example of a lighting system 301 coupled to a bicycle 302 in accordance with various localized dynamo embodiments of the invention. In this example, dynamos 304, 306 have been integrated into the hubs of both wheels 308, 310 of the bicycle 302. Power is generated locally on each wheel 308, 310, allowing for transfer of power to one or more lighting devices 312A-312L positioned on the wheels 308, 310. In various embodiments, the lighting devices 312A-312L may be embedded into or attached to (e.g., by clips) to the rims of the wheels 308, 310, for example. In this embodiment, instead of outputting power through the axle of the hub to the frame of the bicycle 302, the power is output to the rotating portion of the hub to supply local power to each wheel 308, 310. In various embodiments, AC power generated at the hub can be rectified, smoothed and regulated. In certain embodiments, the system 301 can also incorporate a battery to maintain illumination of the lighting devices 312A-312L when the bicycle 302 is stopped or otherwise not moving.

Figure 4:
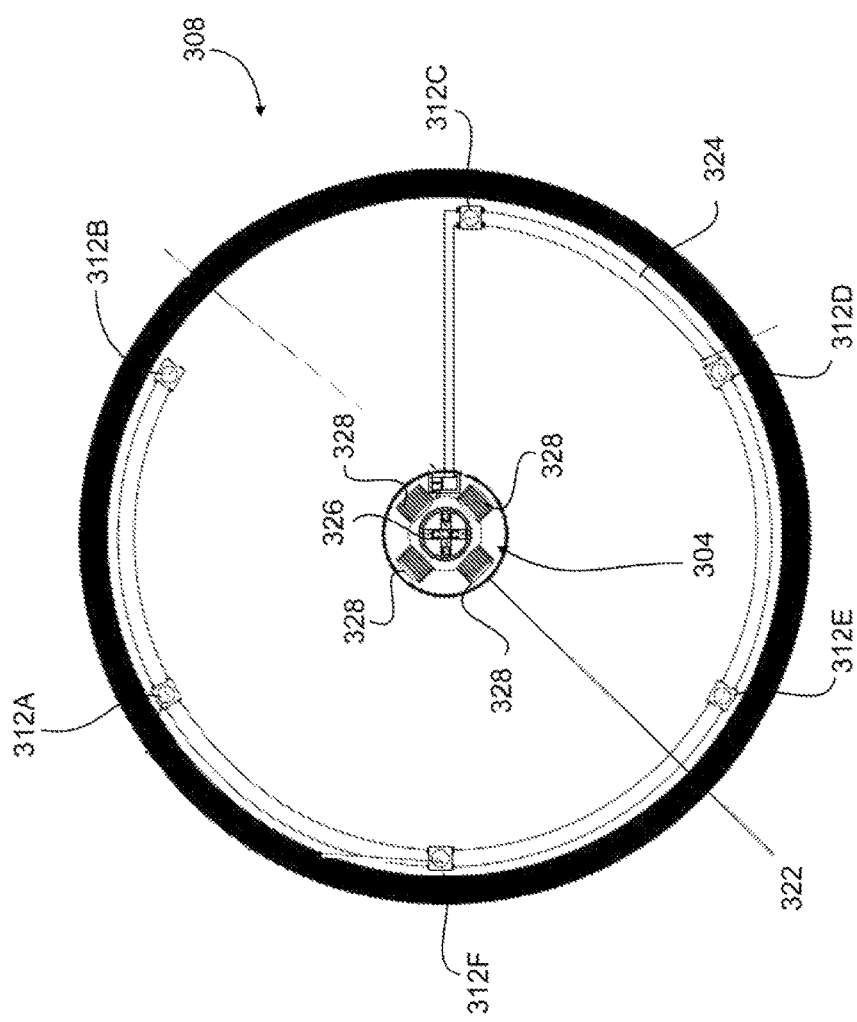
FIG. 4 includes a detailed illustration of one aspect of FIG. 3.
Figure 5:
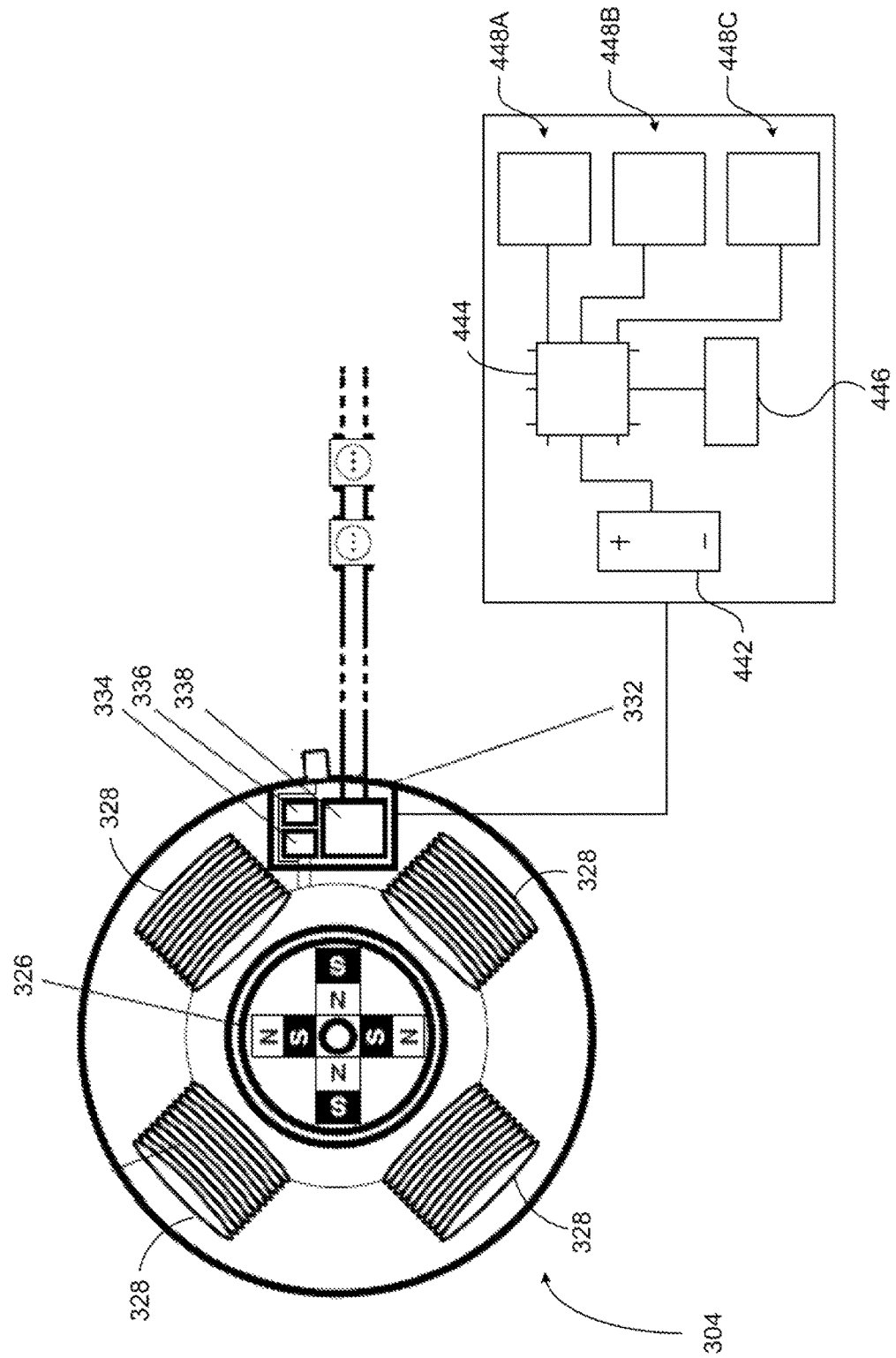
FIG. 5 includes a schematic illustration of one example of a localized dynamo structured in accordance with certain embodiments of the invention.

FIG. 4 illustrates a more detailed view of one wheel 308 that may be structured in accordance with certain localized dynamo embodiments of the invention. The wheel 308 includes the dynamo 304 positioned at the hub 322 of the wheel 308. The dynamo 304 can be electrically connected to the various lighting devices 312A-312L through a wire 324, for example, or through another electrically conductive medium. The lighting devices 312A-312L may be positioned at various locations around the circumference of the wheel 308 and may be attached to (e.g., with clips) or integrated into the structure of the rim or the spokes of the wheel 308, for example. The dynamo 304 may comprise a magnet 326 which is stationary relative to the axle of the hub 322, and a series of armatures 328 that can rotate around the magnet 326 during use of the bicycle and rotation of the wheel 308. In this manner, electrical power is generated during rotation of the wheel 308 which can be transmitted to the lighting devices 312A-312L. With reference to FIG. 5, a control unit 332 may be operatively associated with the dynamo 304 that performs power management or conditioning functions (e.g., through a voltage regulator 334, rectifier 336, and/or capacitor 338 components). The control unit 332 may also include a battery 442, controller 444, a wireless communication module 446, and one or more sensors 448A-448C. Aspects of the control unit 332 can be configured to function in substantial accordance with corresponding aspects of the state sensing and effect system 202 (as described above).

Figure 6:
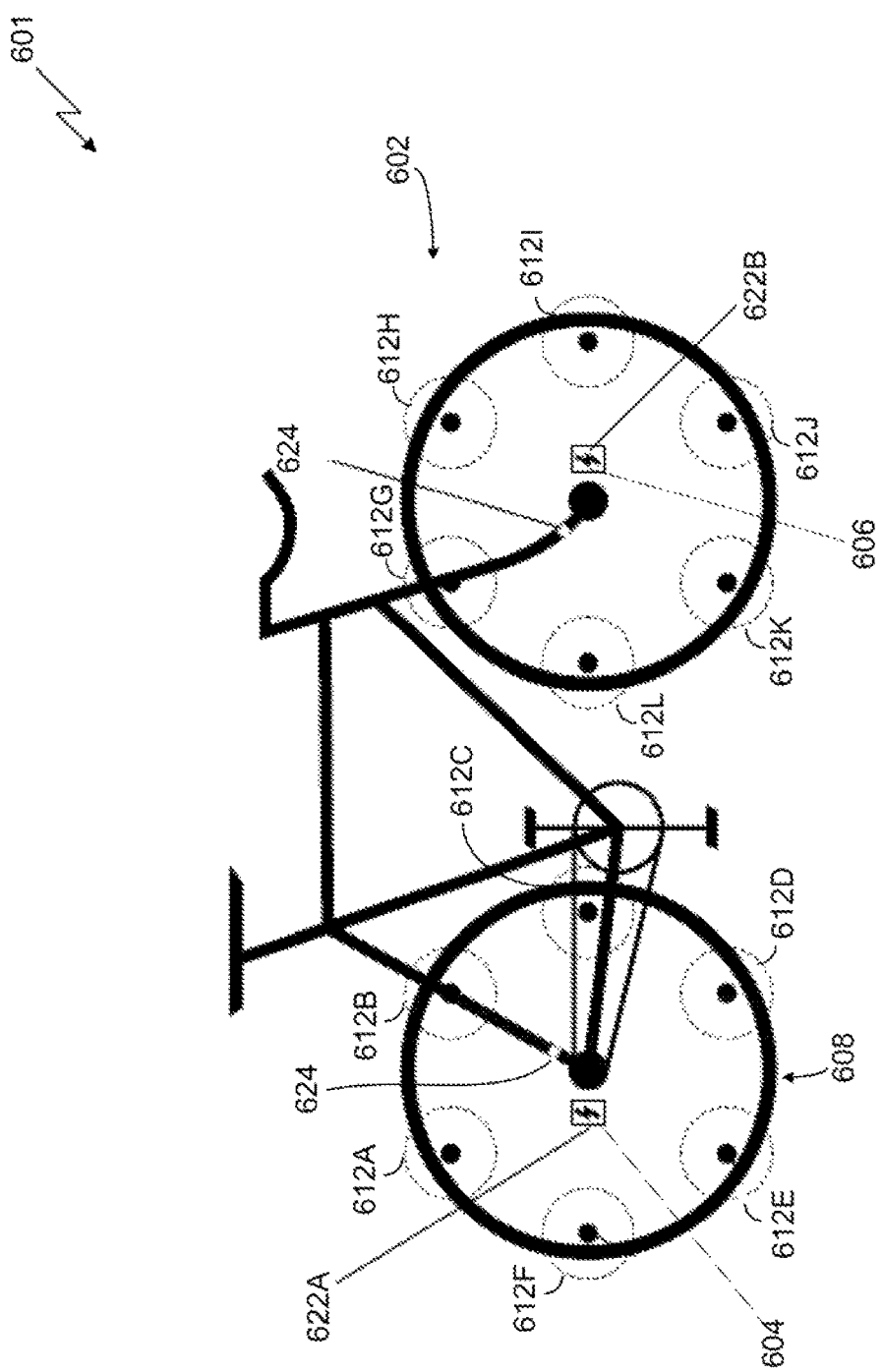
FIG. 6 includes an example of a localized battery embodiment of a lighting system structured in accordance with certain embodiments of the invention.

FIG. 6 schematically illustrates an example of a lighting system 601 coupled to a bicycle 602 in accordance with various localized battery embodiments of the invention. In this example, batteries 604, 606 have been positioned near the hubs of both wheels 608, 610 of the bicycle 602. It can be seen that power is supplied locally on each wheel 608, 610, allowing for transfer of power to one or more lighting devices 612A-612L positioned on the wheels 608, 610. In various embodiments, the lighting devices 612A-612L may be embedded into or attached to (e.g., by clips) to the rims of the wheels 608, 610, for example. In certain embodiments, the batteries 604, 606 can maintain illumination of the lighting devices 612A-612L even when the bicycle 602 is stopped or not moving, for example. The batteries 604, 606 may be part of a control units 622A, 622B (respectively) that can be configured to function in substantial accordance with corresponding aspects of the state sensing and effect system 202 (as described above). In certain embodiments, the control units 622A, 622B may be operatively associated with one or more magnetic sensors 624 attached to the frame of the bicycle 602 for measuring rotation speed of the wheels 608, 610 for example. The control unit 622 may be clipped to the spokes of the wheels 608, 610 for example, at or near the hub of the wheels 608, 610.

Figure 7:
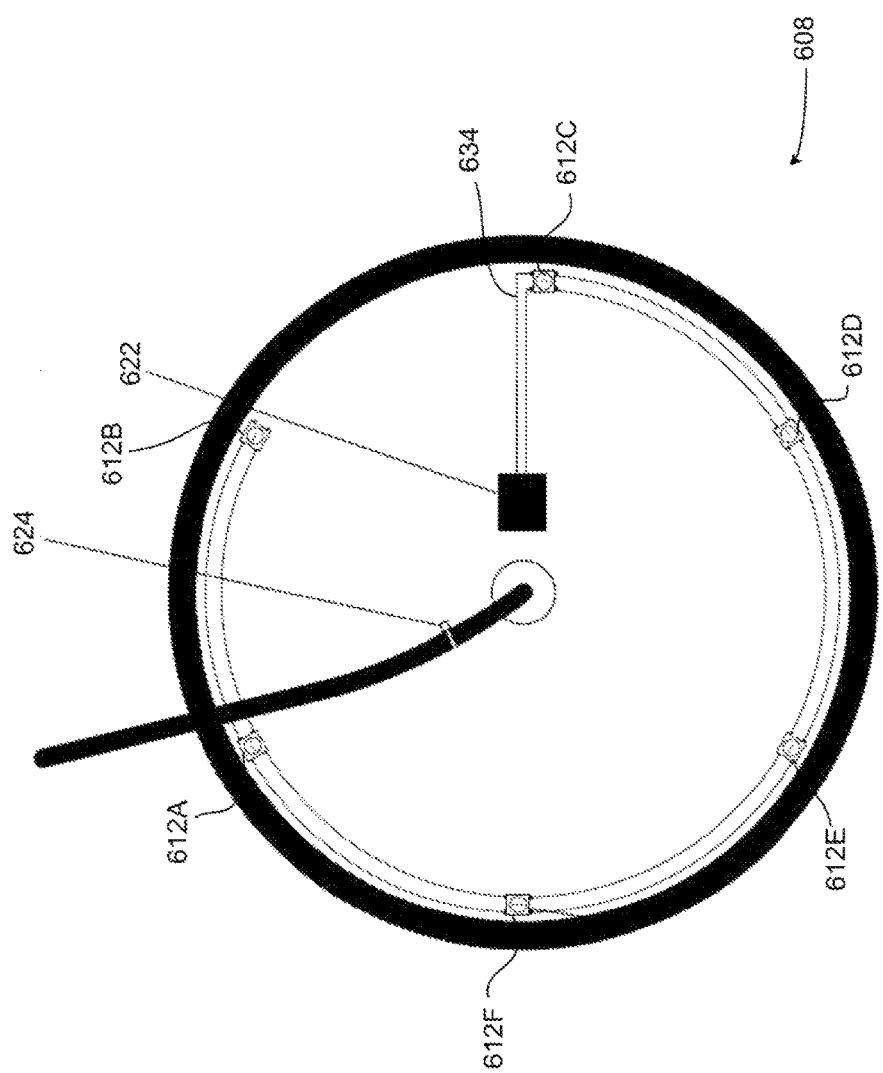
FIG. 7 includes a detailed illustration of one aspect of FIG. 6.
Figure 8:
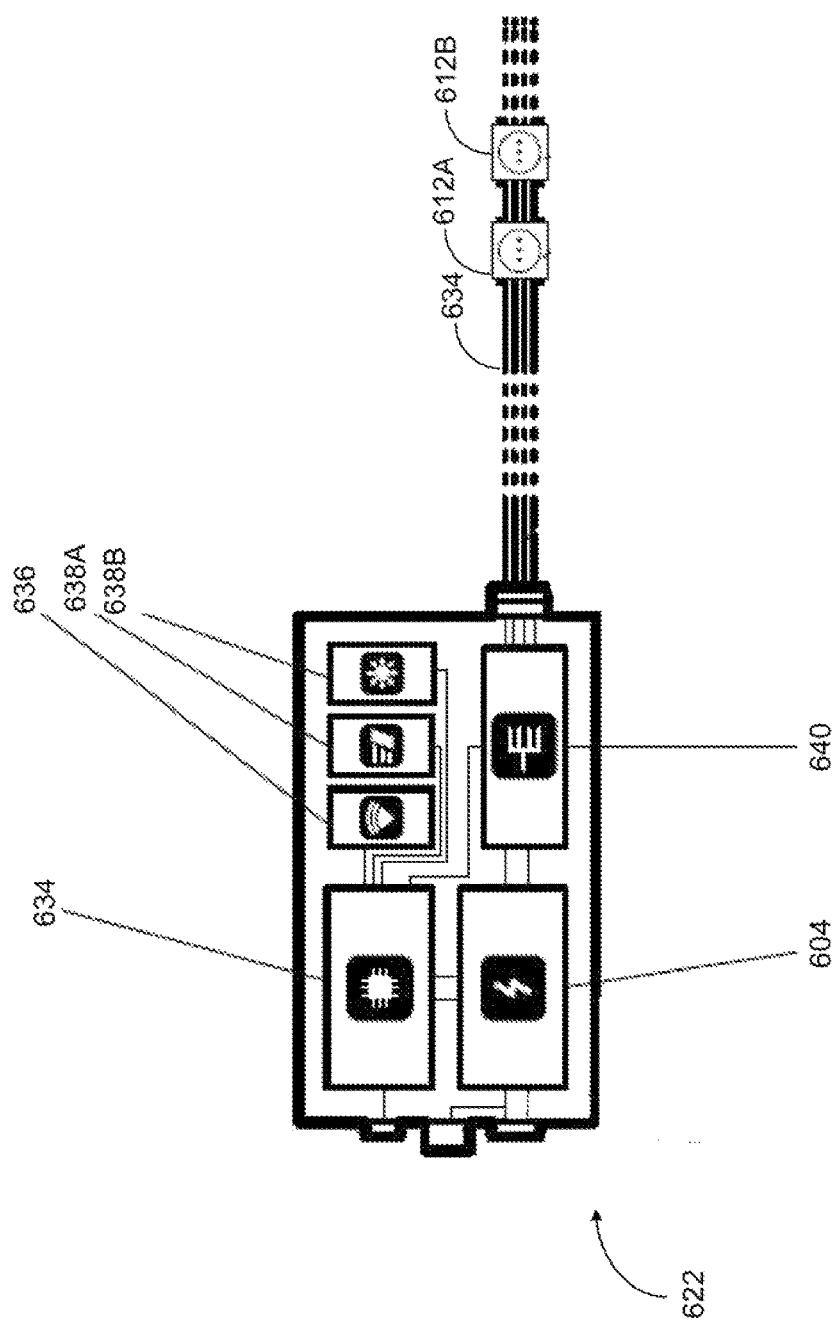
FIG. 8 includes a schematic illustration of one example of a control unit structured for use with a localized battery embodiment of a lighting system structured in accordance with certain embodiments of the invention.

FIG. 7 illustrates a more detailed view of one wheel 608 that may be structured in accordance with certain localized battery embodiments of the invention. As shown, the control unit 622 including the battery 604 can be electrically connected to the various lighting devices 612A-612F through a wire 634, for example, or through another electrically conductive medium. The lighting devices 612A-612F may be positioned at various locations around the circumference of the wheel 608 and may be attached to (e.g., with clips) or integrated into the structure of the rim or the spokes of the wheel 608, for example. With reference to FIG. 8, the control unit 622 may include the battery 604, a controller 634, a wireless communication module 636, and/or one or more sensors 638A-638B. As noted above, one or more aspects of the control unit 622, such as the communication module 636 and/or the sensors 638A-638B, can be configured to function in substantial accordance with corresponding aspects of the state sensing and effect system 202 (as described above). The control unit 622 may further include one or more drivers 640 programmed to direct the lighting effects of the lighting devices 612A-612F. Electrical energy may be transmitted to power the lighting devices 612A-612F through the wire 634, for example.

Figure 9:
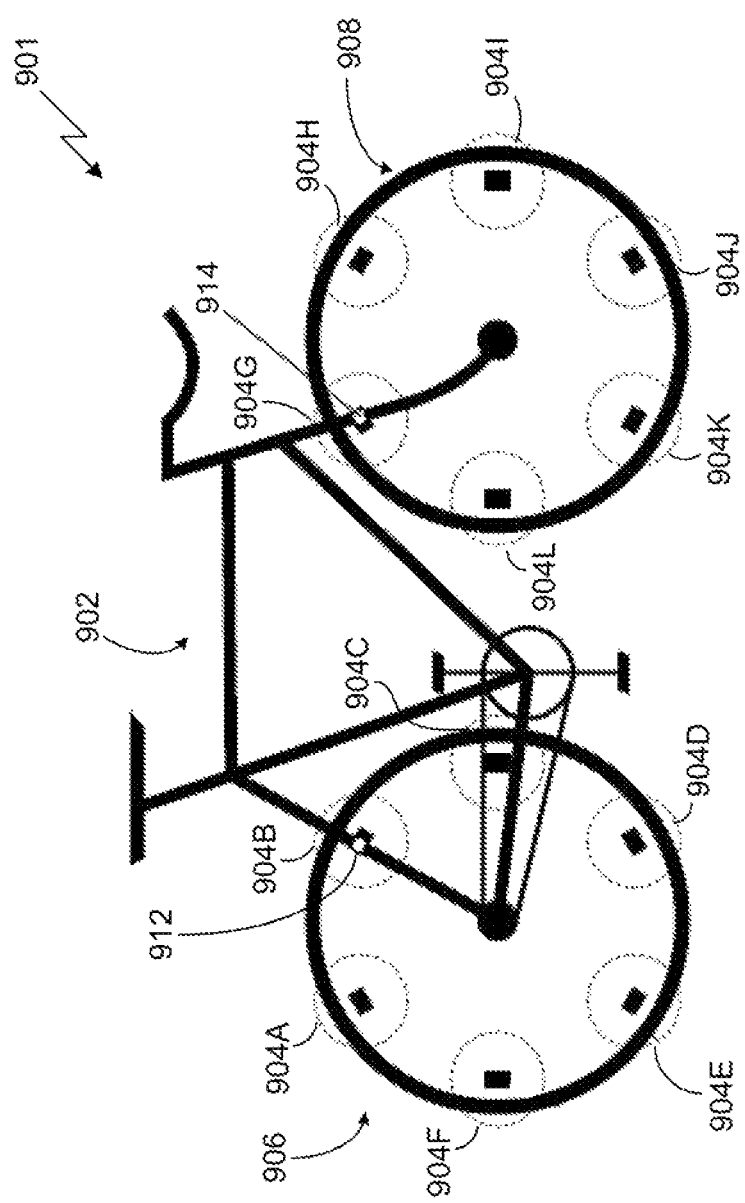
FIG. 9 includes an example of an induction embodiment of a lighting system structured in accordance with certain embodiments of the invention.
Figure 10:
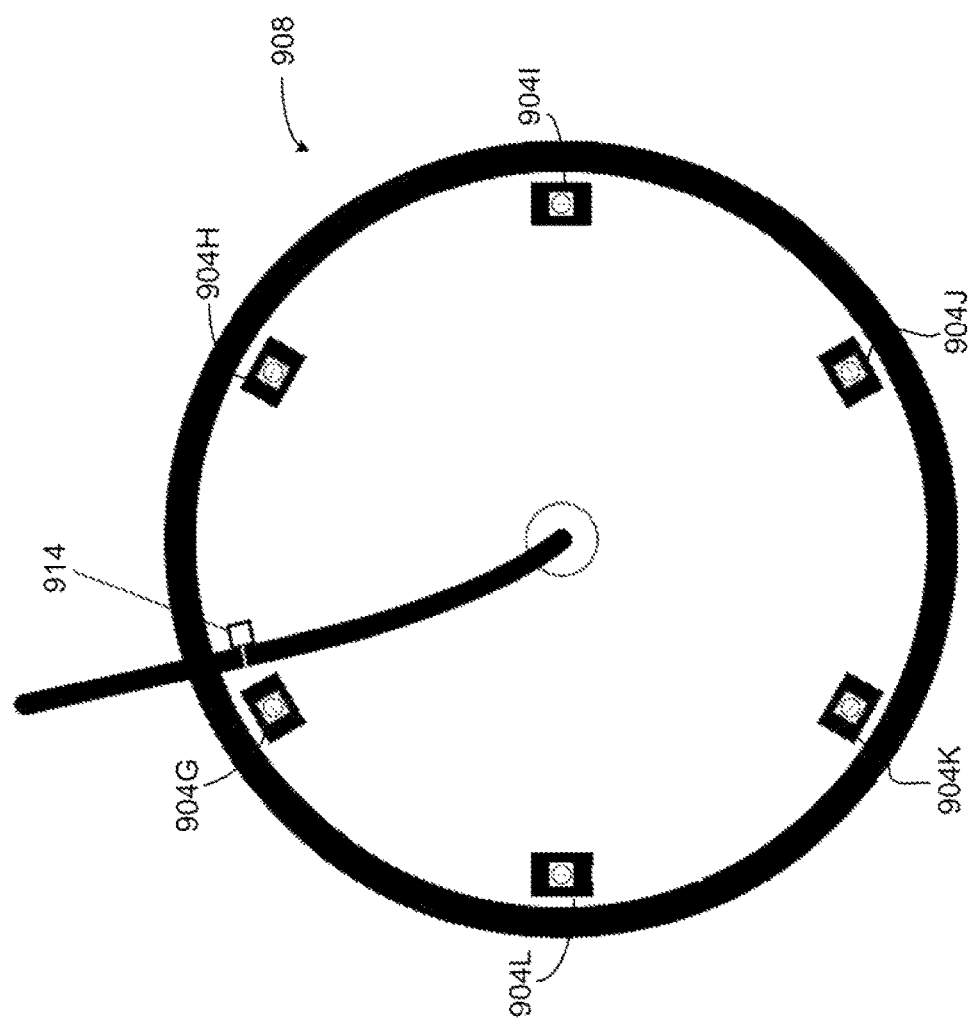
FIG. 10 includes a detailed illustration of one aspect of FIG. 9.
Figure 11:
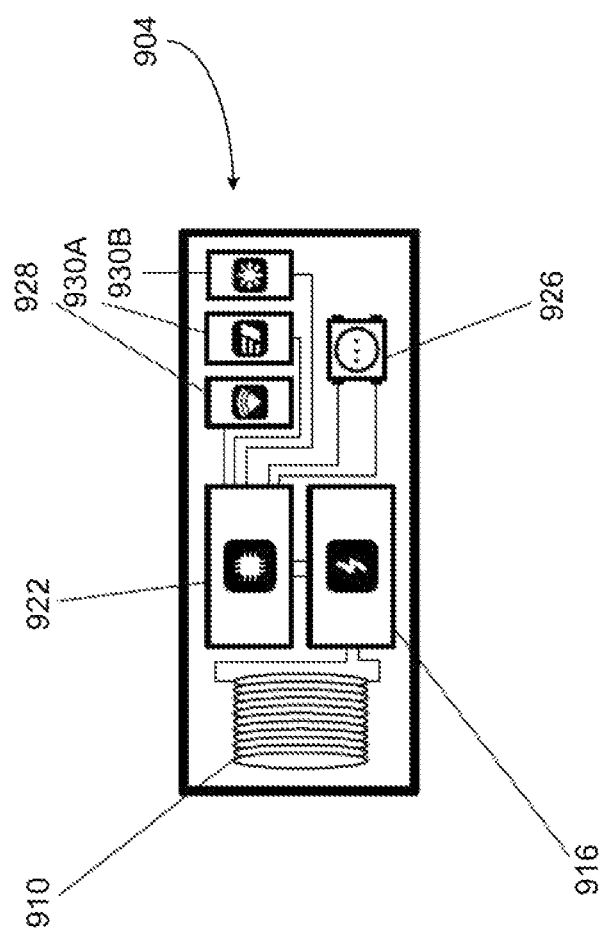
FIG. 11 includes a schematic illustrating one example of an illumination unit that can be structured for use with an induction embodiment of a lighting system structured in accordance with certain embodiments of the invention.

FIGS. 9 through 11 schematically illustrate an example of a lighting system 901 coupled to a bicycle 902 in accordance with various induction embodiments of the invention. In this example, one or more illumination units 904A-904L can be positioned at various locations around the circumference or outer periphery of each wheel 906, 908 of the bicycle. Each illumination unit 904A-904L may include an induction coil 910 which can be structured to interact with a magnet 912, 914, for example, mounted on the frame of the bicycle 902. Through its interaction with the magnet 912, 914, the induction coil 910 generates electrical energy that can be used to power and/or recharge a battery 916 included within each illumination unit 904A-904L. Each illumination unit 904A-904L may further include a controller 922 having one or more LED drivers 924 that direct the function of one or more lighting devices 926 (e.g., LEDs) included within the illumination units 904A-904L. In various embodiments, the illumination units 904A-904L may be embedded into or attached to (e.g., by clips) to the spokes or the rims of the wheels 906, 908, for example. One or more of the illumination units 904A-904L may also include a wireless communication module 928 and one or more sensors 930A-930B. Aspects of each illumination unit 904A-904L, such as the wireless communication module 928, the sensors 930A-930B, and/or the lighting devices 926, can be configured to function in substantial accordance with corresponding aspects of the state sensing and effect system 202 (as described above).

It can be seen that the illumination units 904A-904L may enable, through interaction of the induction coil 910 and the lighting device 926, an analog state sensing and effect control system (consistent with the system 102 described above) with its associated lighting and visual effects. Alternatively, the illumination units 904A-904L may enable digital state sensing and effect control (consistent with the system 202 described above) with its associated wider range of lighting and visual effects.

Figure 12:
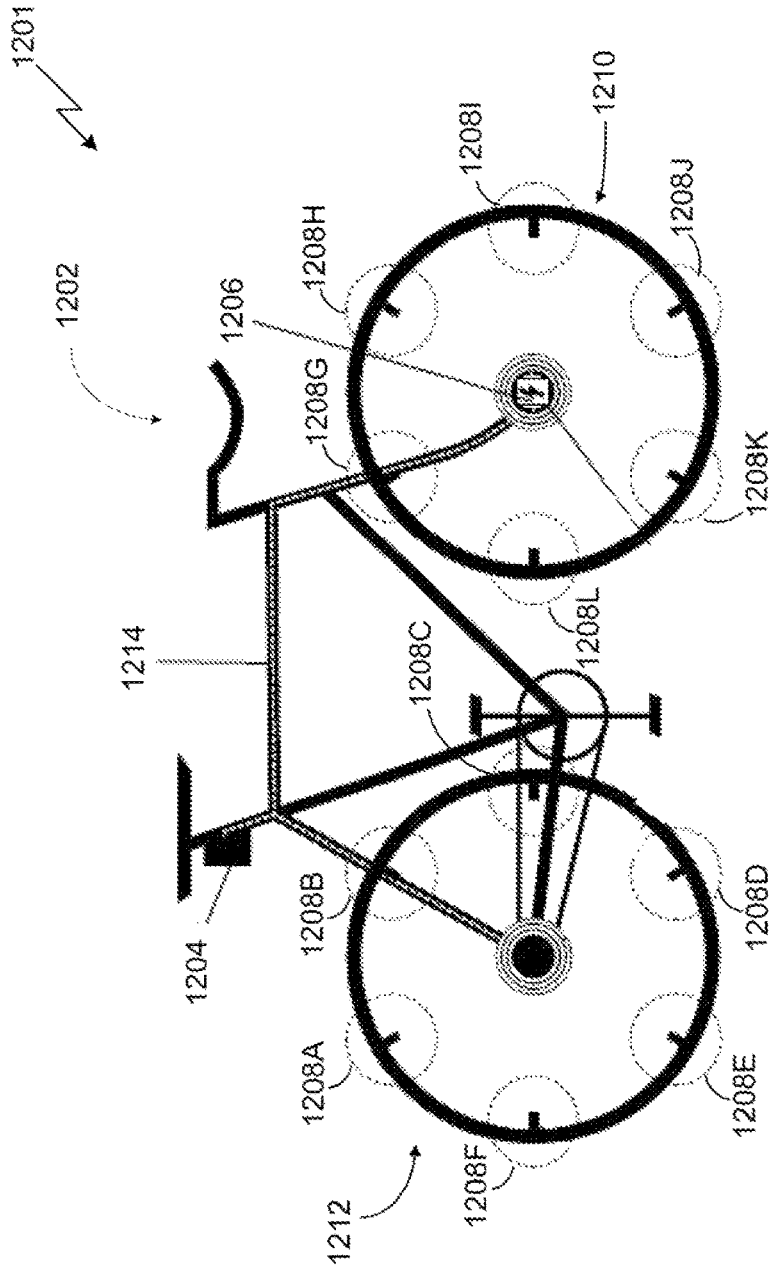
FIG. 12 includes an example of a distributed dynamo embodiment of a lighting system structured in accordance with certain embodiments of the invention.

FIG. 12 schematically illustrates an example of a lighting system 1201 coupled to a bicycle 1202 in accordance with certain distributed dynamo embodiments of the invention. The present system 1201 includes a control unit 1204 which is mounted on the bicycle in a position where it can receive power from either a dynamo 1206 or a battery power pack. The control unit 1204 can further receive input from connected devices, like a smart phone, or a plurality of sensors including rotational, proximity, light, and heat sensors and accelerometers mounted at appropriate locations on the bicycle 1202. The control unit 1204 may also act as the dynamo power control unit as well. The control unit 1204 distributes power to connected peripherals, such as an illumination means 1208A-1208L installed on wheels 1210, 1212 of the bicycle 1202. The control unit 1204 further regulates the peripherals. The control unit 1204 controls the illumination means 1208A-1208L and changes the color and behavior, among other potential visual effects, of the illumination means 1208A-1208L based on information input from sensors or connected devices.

The present system 1201 includes a power system utilized to power the various electrical and electronic components of the present system. In one embodiment, the power system of the present system 1201 includes a hub dynamo 1206 that is used to power the illumination means 1208A-1208L. The hub dynamo 1206 may replace a standard hub of a front wheel 1210 of the bicycle 1202. The hub dynamo 1206 may be controlled by the control unit 1204 acting as a dynamo control unit comprising a controller and power control unit that converts electrical power generated by the hub dynamo 1206 from AC to DC. The control unit 1204 acting as dynamo control unit may be further configured for smoothing the output current from the hub dynamo 1206.

In the example shown, one dynamo 1206 is operatively associated with the hub of the front wheel 1210 of the bicycle 1202. Power is output from the dynamo 1206 at the axle of the hub and distributively routed through the frame of the bicycle by use of a wire connection 1214, for example. At a location on the frame, the control unit 1204 can be positioned to condition and rectify AC power output from the dynamo 1206 into DC power. The signal can also be smoothed using a capacitor included in the control unit 1204 and regulated to a constant voltage, for example. The electrical current can be split into two channels, one for each wheel 1210, 1212, and then transferred to each wheel 1210, 1212 via a suitable power transfer method to power one or more lighting devices 1208A-1208L embedded into or attached to (e.g., by clips) to the rims of the wheels 1210, 1212.

The system 1201 may be configured as a base platform for a range of peripheral products or devices. Examples of peripherals that could be incorporated include, without limitation, a cycling computer, wattage meter, GPS module, proximity sensing module, and/or Bluetooth module to communicate with a mobile phone or other wireless peripherals, for example. In addition, the control unit 1204 could include one or more components of the state sensing and effect system 202 (substantially as described above) and their associated functionality.

Figure 13:
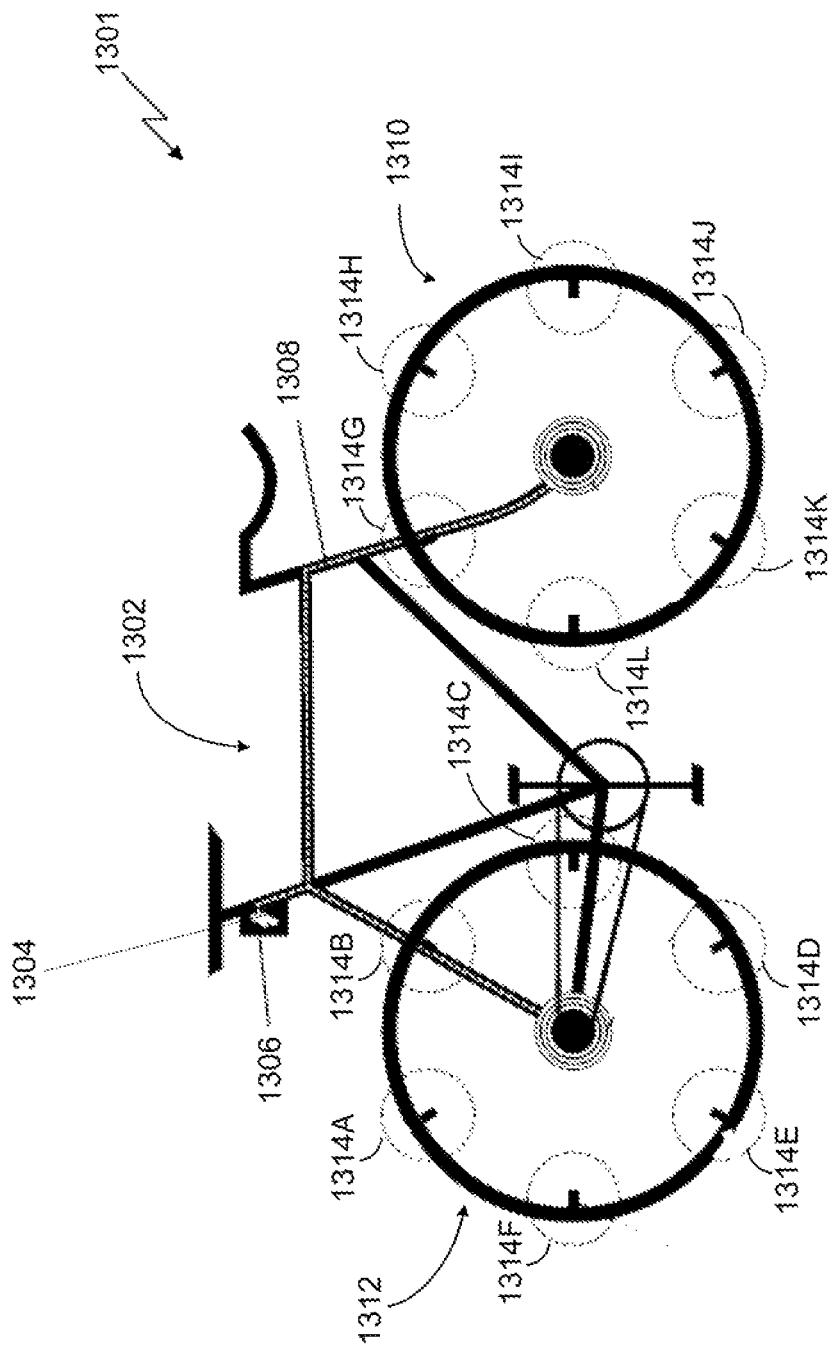
FIG. 13 includes an example of a distributed battery embodiment of a lighting system structured in accordance with certain embodiments of the invention.

FIG. 13 schematically illustrates an example of a lighting system 1301 coupled to a bicycle 1302 in accordance with certain distributed battery embodiments of the invention. As shown, one battery 1304 is positioned as part of a control unit 1306 near the seat of the bicycle 1302. Power is output from the battery 1304 and distributively routed through the frame of the bicycle 1302 by use of a wire connection 1308, for example. The electrical current can be split into multiple channels, one for each wheel 1310, 1312, and then transferred to each wheel 1310, 1312 via a suitable power transfer method to power one or more lighting devices 1314A-1314L embedded into or attached to (e.g., by clips) to the rims of the wheels 1310, 1312.

In various embodiments, the battery 1304 can maintain power for the system 1301 when the bicycle 1302 is stopped or not moving, for example. In addition, the battery could power headlights and tail lights of the bicycle 1302 in addition to the control unit 1306 and the lighting devices 1314A-1314L. In various embodiments, the lighting devices 1314A-1314L may be embedded into or attached to (e.g., by clips) to the rims of the wheels 1310, 1312, for example. In addition, the control unit 1306 could include one or more components of the state sensing and effect system 202 (described above) and their associated functionality. Other peripherals could also be incorporated such as a cycling computer, wattage meter, GPS module, proximity sensing module, and/or Bluetooth module to communicate with a mobile phone or other wireless peripherals, for example.

Various suitable power transfer methods may be applied to different embodiments of the invention described herein. For example, slip rings may be used that comprise circular rotary electrical contacts which can transfer one or multiple channels of data and power from a stationary source to a rotating one. Such slip rings can be mounted coaxially to the axis of the hub of the bicycle and transfer power and data from the stationary frame of the bicycle to the rotating wheel. An induction power transfer method can be used that involves inductive transfer of power and data between the frame and the wheel. The inductive contacts can be circular and mounted coaxially to the axis of the hub or each wheel of the bicycle. Also, a radio power transfer method may be employed that uses radio waves to transmit power. This power transfer method is contactless and data can also be coupled to the power signal during transmission. For example, technology marketed under the "Powercast" trade designation may be used to enable radio power transfer.

Figure 14:
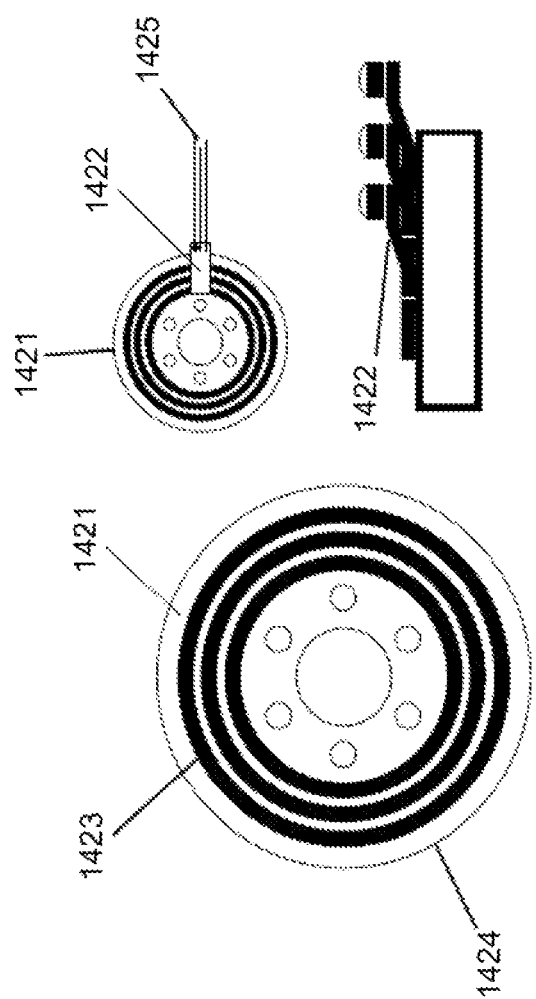
FIG. 14 is a parallel view of the components of a slip ring of the automatic bicycle lighting system, according to one embodiment of the invention.

Referring now to FIG. 14, a parallel view of the components of a slip ring 1421 of the present system is shown. In one embodiment, the slip rings 1421 comprise three silver coated runners 1422 attached to the fork and the rear seat stay of the bicycle. The runners 1422 contact the slip rings 21 to transfer electricity to the slip rings 1421 when mounted on the hub of the wheels of the bicycle. Wire leads 1425 comprising a positive lead attached to one of the three runners 1422 contacting the slip ring 1421 and negative leads each attached to one of the other two runners 1422 contacting the slip ring 1421. The same setup is used in both the front and rear slip rings 1421. The slip rings 1421 are comprised of three concentric copper rings 1423 on a disc shaped body 1424 that can be installed to an existing bicycle 1413. The slip rings 1421 can be fashioned from a PCB and shaped or formed using a disc sander and drill or other conventional mechanical methods. Each slip ring 1421 includes three wires coupled to the copper rings 1423, which comprise one positive and two negative leads corresponding to the runners 1422. The wire leads from the slip rings 1421 may be structured to enter the rim of the wheels of a bicycle through a plurality of small holes drilled through each of the rims.

Figure 15:
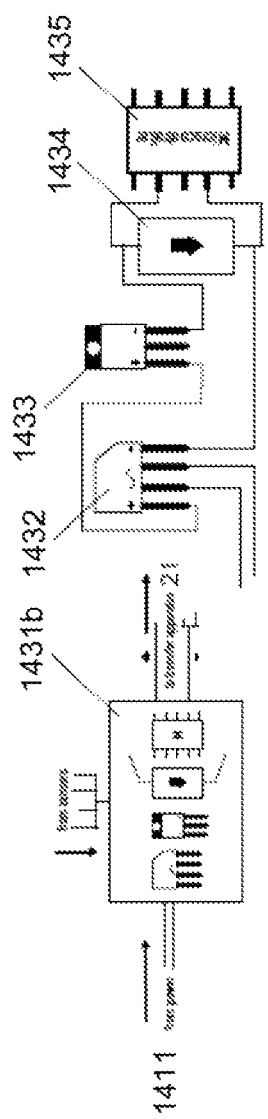
FIG. 15 is an electrical block diagram depicting the major electrical components of a microcontroller unit of the automatic bicycle lighting system, according to one embodiment of the invention.

In one embodiment, a dynamo control unit 1431b, as depicted in FIG. 15 (an electrical block diagram depicting the major electrical components of an example of a controller unit of the present system), utilizes a full wave bridge rectifier 1432 to convert the power output of the hub dynamo 1411 from AC to DC. The power is then routed through a smoothing capacitor 1434, preferably a 4700 uF capacitor, which converts the power output from a pulsating wave to a constant output that is smoothed with the addition of a 12-volt regulator 1433 wired in parallel with the capacitor 1434. From the capacitor 1434, power is transferred to the governing microcontroller 1435 and then to slip rings 1421 mounted to a disc brake mount on the hubs of the front and rear wheels 1414, 1415 of the bicycle 1413.

Figure 16:
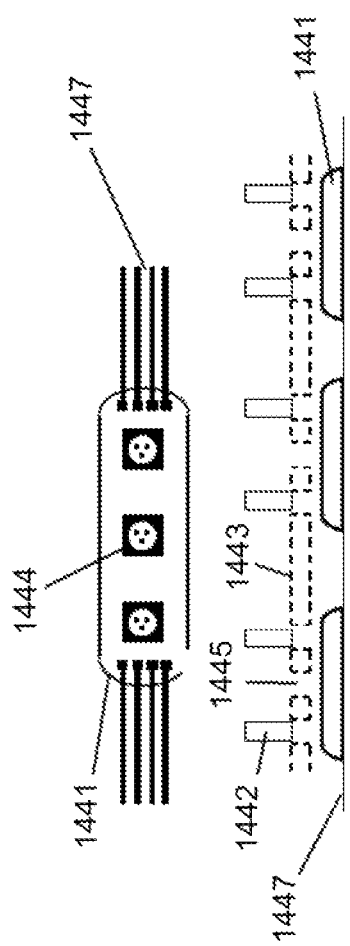
FIG. 16 shows a front view of a plurality of LED strips of the automatic bicycle lighting system, according to one embodiment of the invention; and, FIG. 17 depicts an example of an alternative power set-up in accordance with certain embodiments of the invention.

Referring now to FIGS. 15-17, a front view of an example of a plurality of LED strips 1441 of the present system is shown. The illumination means 1440 may comprise a plurality of LED strips 1441 installed along the rims 1443 of the wheels 1414, 1415 of the bicycle 1413. With rims compatible with the hubs 1443, the LED strips 1441 can be installed to an existing bicycle 1413 by drilling three holes 1445 of spacing equal to the spacing of the LEDs 1444 in the LED strips. The three holes may be drilled in six equal increments between the spoke holes of each rim 1443.

In one embodiment, the illumination means 1440 comprises a plurality of LEDs 1444 obtained from a color LED strip 1441 and separated into twelve sections along separation points such that there are six sections installed for each wheel 1414, 1415. Wires 1447 of equal length are attached to each of the LED strips 1441 to match the spacing of holes 1445 drilled in each rim 1443. The last LED strip 1441 installed on each side is wired to a corresponding slip ring 1421 in the proper polarity orientation. Each large strip assembly of a plurality of LED strips 1441 is then fastened into the rims 1443 and aligned with the holes 1445 drilled in each rim 1443.

In one embodiment, the LED strips 1441 are installed in the rims 1443 with acrylic rods 1442 approx one-quarter (¼) inch in diameter to help light shine through the rims 1443 during use. The rods 1442 are installed by sanding them to make them translucent, cutting them to a desired length, and fastening them within the holes 1445 in the rims 1443.

In operation, as the bicyclist begins to pedal and cause the bicycle 1413 to move, the power generated by the hub dynamo 1411 due to the rotation of the front wheel 1414 is converted from AC to DC by the controller unit 1431b and transferred to the illumination means 1440 by the slip ring 1421. Light is emitted from the rims 1443 of the wheels 1414, 1415 by the illumination means 1440 to indicate the bicycle 1413 is in motion. The present system is configured to vary the color of light emitted from the illumination means 1440 in relation to the speed of the bicycle 1413. At slow speeds, the LEDs 1444 emit a cautionary red color. As the bicycle 1413 increases speed, the light emitted by the LEDs 1444 fades to white. With the use of a sensor coupled to the controller unit 1431b and mounted to a brake lever on the bicycle 1413, the LEDs 1444 can also act as a manual brake light that turns red when the brake lever is depressed. The LEDs 1444 also have the ability to change or alternate between different colors other than red and white according to data supplied by the controller unit 1431b.

In an alternative embodiment, the power system is a portable battery power source located on the frame of the bicycle 1413 in a location that does not interfere with the bicyclist's performance. The battery pack can be rechargeable or disposable. The battery pack is able to output the required power to power both the controller unit 1431b and the attached peripherals such as the illumination means 1440. The battery pack can be used in place of or in conjunction with a dynamo and at either a central location on the bicycle 1413, or a location local to each wheel 1414, 1415. In a central configuration, the present system has one battery pack mounted in an unobtrusive location on the bicycle. The power is split into two channels similarly as in conjunction with the dynamo 1411 based power system described above.

In a local configuration, a battery pack is mounted to a hub of each wheel 1414, 1415. This configuration does not require a power transmission system, as the power source for each wheel is localized. In this configuration, data would be wireless transmitted to each wheel power unit from the controller unit 1431b in order to convey information about the state of the wheel.

Those skilled in the art can appreciate that other close-range power-and-data transfer mechanisms such as magnetic induction or a radio frequency transmitter and receiver 1451a, 1451b can be utilized with similar effect to the slip ring 1421 described above, and as such should not be interpreted as a limiting factor on the present disclosure. In an alternate embodiment, the power transfer apparatus 1451 comprises a plurality of magnets mounted on the frame of the bicycle and corresponding plurality of magnets located near the hubs of the bicycle that transfer power wirelessly. The alternate power transfer apparatus includes magnetic induction transmitters 1451a connected to the microcontroller unit 1435 of the controller unit 1431b and magnetic induction receivers 1451b located near the hubs of the wheels 1414, 1415 and within a necessary proximity to receive power and data from the transmitters 1451a. Alternatively, the transmitters 1451a could be mounted on the bike frame near the surface of the rims 1443 while the matching receivers 1451b would reside directly underneath the rim 1443. The use of a wireless power transfer mechanism increases the operational longevity of the present system by avoiding the high level of wear inherent in slip rings.

FIG. 17 also demonstrates an example of another alternative embodiment. As shown, the power transfer apparatus comprises at least one RF transmitter 1451a located near both the front and rear wheels 1414, 1415 or at an optimal transmitting position 1452 on the bicycle frame. A corresponding RF receiver 1451b is located on the front and rear wheels 1414, 1415, such that power and data is sent from the RF transmitter to the RF receiver 1451b for controlling and powering the connected peripherals such as the illumination means 1440.

The examples presented herein are intended to illustrate potential and specific implementations of the present invention. It can be appreciated that the examples are intended primarily for purposes of illustration of the invention for those skilled in the art. No particular aspect or aspects of the examples are necessarily intended to limit the scope of the present invention. The present systems, methods, features and advantages of the invention will be or will become apparent to one with skill in the art upon examination of the figures and detailed description. It is intended that all such additional methods, features and advantages be included within this description, be within the scope of the invention, and be protected by the accompanying claims. It is also intended that the invention not be limited to require the details of the various examples of embodiments of the invention described herein.

Any element expressed herein as a means for performing a specified function is intended to encompass any way of performing that function including, for example, a combination of elements that performs that function. Furthermore the invention, as may be defined by such means-plus-function claims, resides in the fact that the functionalities provided by the various recited means are combined and brought together in a manner as defined by the appended claims. Therefore, any means that can provide such functionalities may be considered equivalents to the means shown herein.

In accordance with the present system, the best mode may be presented in terms of a preferred embodiment. However, the present system is not limited to the described embodiment and a person skilled in the art will appreciate that many other embodiments are possible without deviating from the basic scope and that any such work around will also fall under the scope of this disclosure. It is envisioned that other styles and configurations can be easily incorporated into the teachings of the present disclosure and only one particular configuration shall be shown and described for purposes of clarity and disclosure and not by way of limitation of scope.

The terms "a" and "an" herein do not denote a limitation of quantity, but rather denote the presence of at least one of the referenced items. It will be appreciated that, for convenience and clarity of disclosure, terms describing relative orientation or spatial positioning such as "proximal," "distal," "vertical," "horizontal," "up," "down," "top," "front," "back," "bottom," "outer," "inner," "upward," or "downward" may be used at times herein with respect to the drawings, text description, or claims in association with various embodiments of the invention. However, such terms are primarily used for illustrative purposes and are not necessarily intended to be limiting in nature.

It is to be understood that the figures and descriptions of the present invention have been simplified to illustrate elements that are relevant for a clear understanding of the present invention, while eliminating, for purposes of clarity, other elements. Those of ordinary skill in the art will recognize, however, that these and other elements may be desirable. However, because such elements are well known in the art, and because they do not facilitate a better understanding of the present invention, a discussion of such elements is not provided herein. It should be appreciated that the figures are presented for illustrative purposes and not as construction drawings. Omitted details and modifications or alternative embodiments are within the purview of persons of ordinary skill in the art. For example, there may be variations to these diagrams or the operations described herein without departing from the spirit of the invention.

It can be appreciated that, in certain aspects of the present invention, a single component may be replaced by multiple components, and multiple components may be replaced by a single component, to provide an element or structure or to perform a given function or functions. Except where such substitution would not be operative to practice certain embodiments of the present invention, such substitution is considered within the scope of the present invention.

In various embodiments, modules or software can be used to practice certain aspects of the invention. For example, software-as-a-service (SaaS) models or application service provider (ASP) models may be employed as software application delivery models to communicate software applications to clients or other users. Such software applications can be downloaded through an Internet connection, for example, and operated either independently (e.g., downloaded to a laptop or desktop computer system) or through a third-party service provider (e.g., accessed through a third-party web site). In addition, cloud computing techniques may be employed in connection with various embodiments of the invention. In certain embodiments, a "module" may include software, firmware, hardware, or any reasonable combination thereof.

Moreover, the processes associated with the present embodiments may be executed by programmable equipment, such as computers. Software or other sets of instructions that may be employed to cause programmable equipment to execute the processes may be stored in any storage device, such as, for example, a computer system (non-volatile) memory, an optical disk, magnetic tape, or magnetic disk. Furthermore, some of the processes may be programmed when the computer system is manufactured or via a computer-readable memory medium.

It can also be appreciated that certain process aspects described herein may be performed using instructions stored on a computer-readable memory medium or media that direct a computer or computer system to perform process steps. A computer-readable medium may include, for example, memory devices such as diskettes, compact discs of both read-only and read/write varieties, optical disk drives, and hard disk drives. A computer-readable medium may also include memory storage that may be physical, virtual, permanent, temporary, semi-permanent and/or semi-temporary.

A "computer," "computer system," "component," or "processor" may be, for example and without limitation, a processor, microcomputer, minicomputer, server, mainframe, laptop, personal data assistant (PDA), wireless e-mail device, cellular phone, pager, processor, fax machine, scanner, or any other programmable device configured to transmit and/or receive data over a network. Computer systems and computer-based devices disclosed herein may include memory for storing certain software applications used in obtaining, processing, and communicating information. It can be appreciated that such memory may be internal or external with respect to operation of the disclosed embodiments. The memory may also include any means for storing software, including a hard disk, an optical disk, floppy disk, ROM (read only memory), RAM (random access memory), PROM (programmable ROM), EEPROM (electrically erasable PROM) and/or other computer-readable memory media. In various embodiments, a "host," "engine," "loader," "filter," "platform," or "component" may include various computers or computer systems, or may include a reasonable combination of software, firmware, and/or hardware.

In various embodiments of the present invention, a single component may be replaced by multiple components, and multiple components may be replaced by a single component, to perform a given function or functions. Except where such substitution would not be operative to practice embodiments of the present invention, such substitution is within the scope of the present invention. Any of the servers described herein, for example, may be replaced by a "server farm" or other grouping of networked servers (e.g., a group of server blades) that are located and configured for cooperative functions. It can be appreciated that a server farm may serve to distribute workload between/among individual components of the farm and may expedite computing processes by harnessing the collective and cooperative power of multiple servers. Such server farms may employ load-balancing software that accomplishes tasks such as, for example, tracking demand for processing power from different machines, prioritizing and scheduling tasks based on network demand, and/or providing backup contingency in the event of component failure or reduction in operability.

In general, it will be apparent to one of ordinary skill in the art that various embodiments described herein, or components or parts thereof, may be implemented in many different embodiments of software, firmware, and/or hardware, or modules thereof. The software code or specialized control hardware used to implement some of the present embodiments is not limiting of the present invention. For example, the embodiments described hereinabove may be implemented in computer software using any suitable computer programming language such as .NET, SQL, MySQL, or HTML using, for example, conventional or object-oriented techniques. Programming languages for computer software and other computer-implemented instructions may be translated into machine language by a compiler or an assembler before execution and/or may be translated directly at run time by an interpreter. Examples of assembly languages include ARM, MIPS, and x86; examples of high level languages include Ada, BASIC, C, C++, C#, COBOL, Fortran, Java, Lisp, Pascal, Object Pascal; and examples of scripting languages include Bourne script, JavaScript, Python, Ruby, PHP, and Perl. Various embodiments may be employed in a Lotus Notes environment, for example. Such software may be stored on any type of suitable computer-readable medium or media such as, for example, a magnetic or optical storage medium. Thus, the operation and behavior of the embodiments are described without specific reference to the actual software code or specialized hardware components. The absence of such specific references is feasible because it is clearly understood that artisans of ordinary skill would be able to design software and control hardware to implement the embodiments of the present invention based on the description herein with only a reasonable effort and without undue experimentation.

Various embodiments of the systems and methods described herein may employ one or more electronic computer networks to promote communication among different components, transfer data, or to share resources and information. Such computer networks can be classified according to the hardware and software technology that is used to interconnect the devices in the network, such as optical fiber, Ethernet, wireless LAN, HomePNA, power line communication or G.hn. The computer networks may also be embodied as one or more of the following types of networks: local area network (LAN); metropolitan area network (MAN); wide area network (WAN); virtual private network (VPN); storage area network (SAN); or global area network (GAN), among other network varieties.

In the description above, for purposes of explanation only, specific nomenclature has been used to provide a thorough understanding of the present disclosure. However, it will be apparent to one skilled in the art that these specific details are not required to practice the teachings of the present disclosure. The various features of the representative examples and the dependent claims may be combined in ways that are not specifically and explicitly enumerated in order to provide additional useful embodiments of the present teachings. It is also expressly noted that all value ranges or indications of groups of entities disclose every possible intermediate value or intermediate entity for the purpose of original disclosure, as well as for the purpose of restricting the claimed subject matter.

It is understood that the embodiments described herein are for the purpose of elucidation and should not be considered limiting the subject matter of the disclosure. Various modifications, uses, substitutions, combinations, improvements, methods of productions without departing from the scope or spirit of the present invention would be evident to a person skilled in the art. For example, those skilled in the art can appreciate that the specific ordering and combination of process actions described herein is merely illustrative, unless otherwise stated, and the invention can be performed using different or additional process actions, or a different combination or ordering of process actions. As another example, each feature of one embodiment can be mixed and matched with other features shown in other embodiments. Features and processes known to those of ordinary skill may similarly be incorporated as desired. Additionally and obviously, features may be added or subtracted as desired. Accordingly, the invention is not to be restricted except in light of the attached claims and their equivalents.

While various embodiments of the invention have been described herein, it should be apparent that various modifications, alterations and adaptations to those embodiments may occur to persons skilled in the art with the attainment of some or all of the advantages of the present invention. The disclosed embodiments are therefore intended to include all such modifications, alterations and adaptations without departing from the scope and spirit of the present invention as claimed herein.

What is claimed is:

1. A lighting system for use with a bicycle with front and rear wheels, the lighting system comprising:

at least one battery structured for supplying electrical power in association with the operation of the bicycle;

a plurality of lighting devices, wherein a first set of the plurality of lighting devices are each connected to a rim of the front wheel and a second set of the plurality of lighting devices are each connected to a rim of the rear wheel, and wherein each of the plurality of lighting devices comprises an induction coil and the at least one battery;

a magnet mounted on a frame of the bicycle, such that movement of the front wheel and the rear wheel relative to the frame causes the plurality of lighting devices to move relative to the magnet, and such that relative movement between the induction coil and the magnet induces the induction coil to generate electrical energy to power the at least one battery;

at least one speed sensor for sensing rotational speed of at least one of the front and rear wheels;

a location sensing device for sensing a location of the bicycle;

a controller that is connected to the at least one speed sensor and is connected to the plurality of lighting devices, wherein the at least one speed sensor transmits a signal indicating the sensed rotational speed to the controller, the controller wirelessly receives location-based accident propensity data from a remote database based on a location of the bicycle sensed by the location sensing device, and the controller is programmed to control the plurality of lighting devices:

to change a color emitted by the plurality of lighting devices to indicate a change in the sensed rotational speed; and to change at least one additional characteristic of the plurality of lighting devices based on the location-based accident propensity data from the remote database.

2. The lighting system of claim 1, wherein each of the plurality of lighting devices comprise a light emitting diode.

3. The lighting system of claim 1, wherein the generated electrical energy is applied to the battery for recharging.

4. The lighting system of claim 1, wherein the controller is programmed to control the plurality of lighting devices to change the color emitted by the plurality of lighting devices to indicate a change in the sensed rotational speed further comprises to change a brightness of the emitted color.

5. The lighting system of claim 1, wherein the controller is further programmed to control the plurality of lighting devices to change a second color emitted by the plurality of lighting devices based on a command received from a remote mobile communication device.

6. The lighting system of claim 1, wherein the at least one speed sensor includes at least one magnetic sensor.

7. The lighting system of claim 1, wherein the controller is programmed to control the plurality of lighting devices to change the color emitted by the plurality of lighting devices to indicate a change in the sensed rotational speed further comprises to indicate a change in the sensed rotational speed over a predetermined duration of time.

8. The lighting system of claim 1, further comprising a light sensor for transmitting a signal indicating a sensed environmental lighting condition in association with operation of the bicycle.

9. The lighting system of claim 8, wherein the color emitted by the plurality of lighting devices to indicate a change in the sensed rotational speed is a first emitted color and the change in the sensed rotational speed is a first change in sensed rotational speed, and wherein the controller is further programmed to control the plurality of lighting devices to change a second color emitted by the plurality of lighting devices based on the sensed environmental lighting condition.

10. The lighting system of claim 1, wherein the color emitted by the plurality of lighting devices to indicate a change in the sensed rotational speed is a first emitted color and the change in the sensed rotational speed is a first change in sensed rotational speed, and wherein the controller is further programmed to control the plurality of lighting devices to change a second color emitted by the plurality of lighting devices.

11. The lighting system of claim 10, wherein the second color is changed based on information received from a physiological monitor.

12. The lighting system of claim 10, wherein the controller is further programmed to control the plurality of lighting devices to change the second color emitted by the plurality of lighting devices to indicate a change in direction of the bicycle.

13. The lighting system of claim 10, wherein the the second color is changed based on information received from at least one social network.

14. The lighting system of claim 10, wherein the controller is further programmed to control the plurality of lighting devices to change the second color emitted by the plurality of lighting devices to indicate that at least one of a bicycle acceleration and a bicycle deceleration exceeds a predetermined threshold.

15. The lighting system of claim 10, wherein the controller is further programmed to control the plurality of lighting devices to change the second color emitted by the plurality of lighting devices to indicate a weather condition.

16. The lighting system of claim 10, wherein the controller is further programmed to control the plurality of lighting devices to change the second color emitted by the plurality of lighting devices to indicate a predetermined distance between the location of the bicycle and a predetermined destination.

17. The lighting system of claim 1, wherein the location sensing device comprises a GPS device.

18. The lighting system of claim 1, wherein the at least one speed sensor comprises the magnet.

19. The lighting system of claim 1, wherein the at least one additional characteristic comprises flashing the plurality of lighting devices.

* * * * *